United States Patent
Bataller et al.

(10) Patent No.: US 9,619,634 B2
(45) Date of Patent: Apr. 11, 2017

(54) IDENTIFICATION SYSTEM

(71) Applicant: Accenture Global Services Limited, Dublin (IE)

(72) Inventors: Cyrille Bataller, Mougins (FR); Giuseppe Giordano, Juan les Pins (FR)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 195 days.

(21) Appl. No.: 14/473,439

(22) Filed: Aug. 29, 2014

(65) Prior Publication Data
US 2015/0067890 A1 Mar. 5, 2015

(30) Foreign Application Priority Data

Aug. 29, 2013 (EP) .................................. 13306181

(51) Int. Cl.
*G06F 21/32* (2013.01)
*G06Q 10/00* (2012.01)
*G06Q 10/10* (2012.01)
*G06F 21/62* (2013.01)

(52) U.S. Cl.
CPC .......... *G06F 21/32* (2013.01); *G06F 21/6218* (2013.01); *G06Q 10/00* (2013.01); *G06Q 10/105* (2013.01); *G06F 2221/2111* (2013.01)

(58) Field of Classification Search
CPC .. G06Q 10/00; G06Q 10/105; G06F 21/6218; G06F 21/32
See application file for complete search history.

(56) References Cited

U.S. PATENT DOCUMENTS

| 5,465,303 | A | 11/1995 | Levison et al. |
| 6,356,868 | B1 | 3/2002 | Yuschik et al. |
| 7,360,248 | B1 | 4/2008 | Kanevsky et al. |
| 7,668,843 | B2 * | 2/2010 | Ertoz .................. G06F 21/552 706/20 |
| 8,028,896 | B2 | 10/2011 | Carter et al. |
| 8,028,903 | B1 | 10/2011 | Daniel |

(Continued)

FOREIGN PATENT DOCUMENTS

| EP | 2579182 | 4/2013 |
| WO | 2010047695 | 4/2010 |
| WO | 2011/032263 | 3/2011 |

OTHER PUBLICATIONS

European Search Report for Application No. EP 13306181, Issued Dec. 24, 2013.

*Primary Examiner* — Jung Kim
*Assistant Examiner* — Tri Tran
(74) *Attorney, Agent, or Firm* — Mannava & Kang, P.C.

(57) ABSTRACT

The invention concerns a method of identification of a person to be identified, comprising: receiving, from an input device (106A to 106C), user input data of the person to be identified and location data indicating the location of the person to be identified; and identifying by a processing device, in a user database (108) storing a plurality of user records of registered users, each record comprising user reference data and historical location information of a registered user, a record of the person to be identified based on the user input data and the location data, wherein the historical location information of at least one of the registered users includes an association of time and location data provided by a user location device associated with the registered user.

13 Claims, 4 Drawing Sheets

(56) References Cited

U.S. PATENT DOCUMENTS

| | | | |
|---|---|---|---|
| 8,589,298 B2* | 11/2013 | Choudhuri | G06Q 40/00 705/30 |
| 2002/0073099 A1 | 6/2002 | Gilbert et al. | |
| 2004/0062426 A1 | 4/2004 | Lo | |
| 2004/0172403 A1 | 9/2004 | Steele et al. | |
| 2009/0234826 A1 | 9/2009 | Bidlack | |
| 2009/0254448 A1* | 10/2009 | Giobbi | G06K 9/00885 705/26.1 |
| 2010/0022254 A1 | 1/2010 | Ashfield et al. | |
| 2010/0182123 A1 | 7/2010 | Press | |
| 2011/0161005 A1 | 6/2011 | Hajianpour et al. | |
| 2011/0314526 A1 | 12/2011 | Valentine et al. | |
| 2012/0244885 A1* | 9/2012 | Hefetz | G06Q 20/32 455/456.2 |
| 2013/0046692 A1* | 2/2013 | Grigg | G06Q 40/00 705/44 |

\* cited by examiner

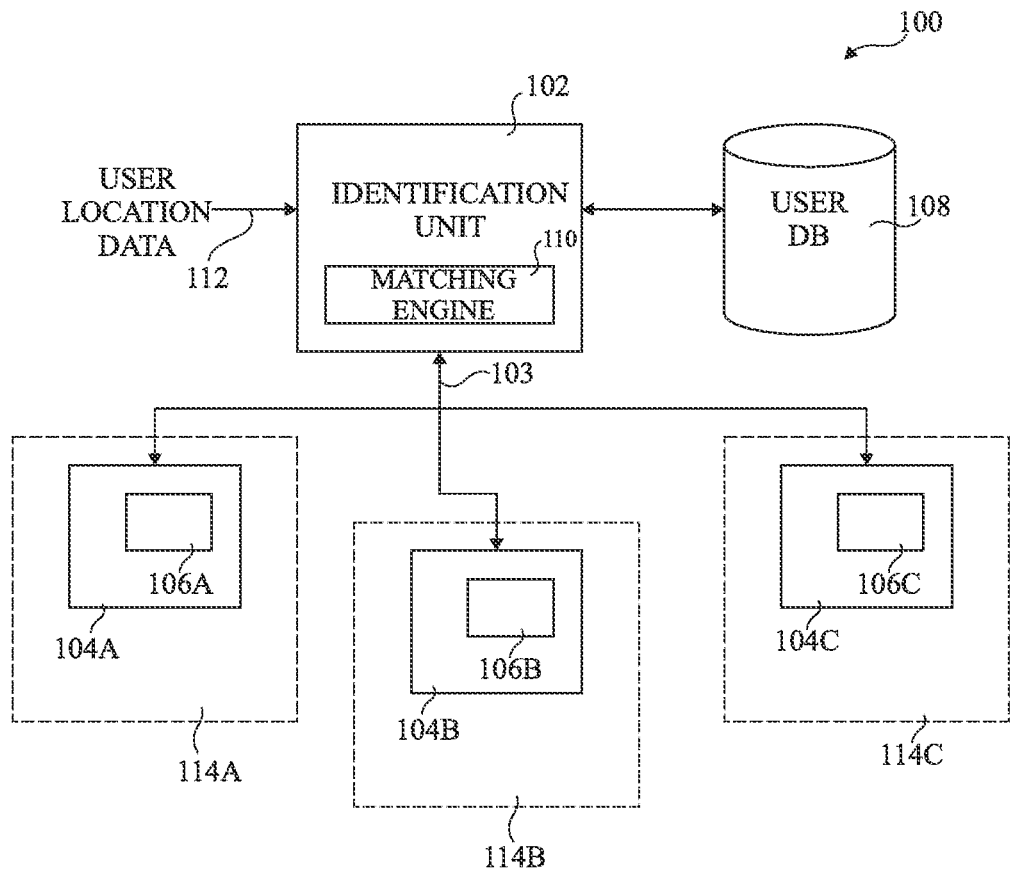

IDENTIFICATION SYSTEM

FIELD

The present disclosure relates to identifying a record in a user database based on user input data.

BACKGROUND

The use of biometric data for the identification of individuals is increasingly becoming the preferred choice in many environments due to the relative difficulty in fraudulently replicating the data. Furthermore, such an identification method requires no item of physical identification, such as an ID card, mobile phone, or payment card, to be carried.

For example, due to increasing fraud involving payment cards such as credit cards, it has been proposed to use biometric data, for example fingerprints, to identify customers in shops or supermarkets, allowing a payment transaction to be initiated. As a further example, biometric data is increasingly used for identifying individuals authorized to enter restricted areas, such as, for example, gyms, apartment blocks or vehicles, or to pass through border controls.

To identify individuals, a biometric sample is obtained and compared to the records of a database, until a match is found. In the majority of applications, speed is of the essence. For example, if a user is at the checkout of a supermarket, or at a border control gate, an identification delay of more than several seconds may be considered unacceptable. A further requirement is that there are very few errors, i.e. very few false positive and false negative results. Indeed, if a customer at the checkout of a supermarket cannot be identified, or is wrongly identified, this could lead to the customer being unable to make the payment, or to the wrong person being billed.

However, biometric databases often contain thousands or millions or records, and there is an ever present technical problem in increasing the identification speed of a person in such a database, without a significant increase in the hardware resources used to perform the identification.

Alternative solutions for identifying an individual, such as the use of a credit card or password, may lead to a relatively fast identification, but tend to be less secure than the use of biometric data. There is equally a technical problem in increasing the security of such alternative forms of identification without significantly adding to the complexity of the solution.

SUMMARY

It is an aim of embodiments of the present disclosure to at least partially address one or more problems in the prior art.

According to one aspect, there is provided a method of identification of a person to be identified, comprising: receiving, from an input device, user input data of the person to be identified and location data indicating the location of the person to be identified; and identifying by a processing device, in a user database storing a plurality of user records of registered users, each record comprising user reference data and historical location information of a registered user, a record of the person to be identified based on the user input data and the location data, wherein the historical location information of at least one of the registered users includes an association of time and location data provided by a user location device associated with the registered user.

According to one embodiment, the record is identified further based on the historical location information and the user reference data of at least some of the records.

According to one embodiment, the user input data and the user reference data each comprise: a biometric sample; or a user identification number; or a user password or pin number; or any combination of the above.

According to one embodiment, the user input data is a biometric sample of the person to be identified, the user database is a biometric database, and the user reference data is a biometric reference sample.

According to one embodiment, the location data is a location associated with an authorization requesting module comprising the input device.

According to one embodiment, the location data indicates a geographical zone within which the authorization requesting module is located.

According to one embodiment, identifying a record based on the user input data and the location data comprises: selecting a subset of the plurality of records based on a comparison between the location data and the historical location information; and applying a matching process to the selected subset.

According to one embodiment, the subset is selected based on the distance between the location of the person to be identified and a location indicated by the historical location information.

According to one embodiment, the subset is additionally selected based on the age of the historical location information.

According to one embodiment, the method further comprises, prior to receiving the input biometric sample: receiving, from a user location device associated with the person to be identified, location information indicating the location of the user location device and an identifier of the person, and storing the location information in the biometric database to provide the historical location information.

According to a further aspect, there is provided a method of making a financial transaction comprising: identifying, according to the above method, a person making a financial transaction request; and transmitting by the processing device an output signal authorizing the financial transaction.

According to a further aspect, there is provided an identification system comprising: a user database storing a plurality of records of registered users, each record comprising user reference data and historical location information of a registered user, wherein the historical location information includes an association of time and location data; and a processing device adapted to: receive, from a user location device associated with one of the registered users, time and location data forming the historical location information of the registered user; receive, from an input device, user input data of the person to be identified and location data indicating the location of the person to be identified; and identify a record of the person to be identified based on the user input data and on the location data.

According to one embodiment, the input device is a biometric capturing device, the user input data is an input biometric sample, and the user reference data is a reference biometric sample.

According to one embodiment, the processing device is further adapted to transmit an output signal to: a merchant payment terminal; or an entry system to a restricted area; or a border control gate; or a combination of any of the above.

According to one embodiment, the identification system further comprises at least one user location device associated with one of the registered users and adapted to provide the historical location data.

BRIEF DESCRIPTION OF THE DRAWINGS

The foregoing and other purposes, features and aspects of the disclosure will become apparent from the following detailed description of example embodiments, given by way of illustration and not limitation with reference to the accompanying drawings, in which:

FIG. 1 schematically illustrates a user identification system according to an example embodiment of the present disclosure;

FIG. 2 illustrates a portion of a user database according to an example embodiment of the present disclosure;

Throughout the figures, like features have been labelled with like reference numerals.

DETAILED DESCRIPTION

Figure 3:
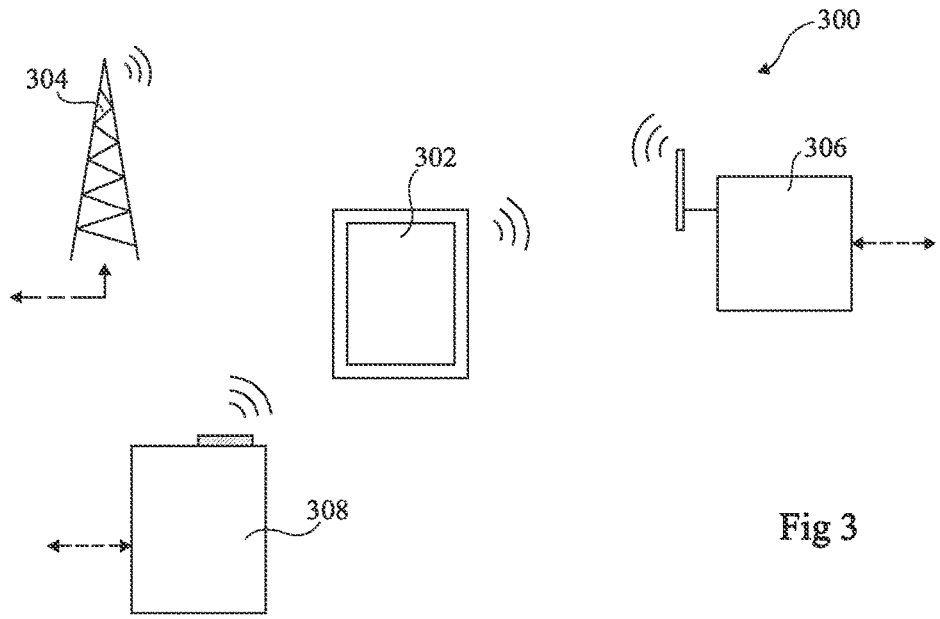
FIG. 3 schematically illustrates a user location system according to an example embodiment of the present disclosure.

Throughout the following disclosure, embodiments will be described that are primarily aimed at facilitating payment transactions using biometric identification. It will however be apparent to those skilled in the art that the embodiments described herein could be equally applied to alternative applications, based on user biometric samples or on other types of user data.

FIG. 1 illustrates an identification system 100 comprising an identification unit 102 for identifying a person. The identification unit 102 receives user input data, via a communication channel 103, from an authorization requesting module, of which three are illustrated in FIG. 1 labelled 104A, 104B and 104C. Indeed, the identification unit 102 for example provides a centralized, "in the cloud", identification service for a plurality of authorization requesting modules. In alternative embodiments, there could be just one or two such modules in the system, or more than three.

For example, each of the authorization requesting modules 104A to 104C corresponds to a merchant payment terminal in a shop or restaurant, to a border control apparatus, or to another form of machine for authorizing a person to do something.

The communication channel 103 could for example be a wired and/or wireless connection comprising a local area network (LAN), a metropolitan data network (MAN), wide area network (WAN) and/or the internet.

Each of the authorization requesting modules 104A to 104C for example comprises a corresponding input device 106A to 106C. The input devices 106A to 106C are for example biometric capturing devices, in other words any type of sensor suitable for capturing a biometric sample of a person present at the device, and could comprise one or more of the following: visible light or infra-red cameras for taking facial images, iris scans, finger vein or palm vein images etc., fingerprint sensors, or microphones for voice identification. A biometric sample is defined herein as data in the form of an image and/or biometric template based on the image, representing biometric data of an individual. Alternatively, the input devices 106A to 106C could be devices allowing other types of user input data to be submitted, such as a keyboard, number pad or touch screen via which a password or pin can be entered, or a card reader for reading a machine readable card, such as a credit card or the like.

The identification unit 102 has access to a user database 108, which stores a plurality of user records each associated with a registered user. Each record contains user reference data, for example comprising one or more reference biometric samples and/or other identifying data of the corresponding registered user. A registered user is for example someone who has registered with the system so as to be identifiable when they present themselves at one of the authorization requesting modules 104A to 104C.

When a person presents themselves at one of the authorization requesting modules 104A to 104C and submits user input data via the corresponding input device 106A to 106C, the authorization requesting module submits an identification request to the identification unit 102. The identification unit 102 comprises a matching engine 110, which searches, based on a matching algorithm, the user database 108 for a record having user reference data matching the user input data. In the case of a biometric identification system, there will generally never be a perfect match between a reference biometric sample of the record and the input sample of the person to be identified. Therefore, a matching record is for example considered herein to correspond to one for which there is a minimum level of certainty of a match. For example, the level of similarity between the reference sample and the input sample is above a defined minimum threshold.

It will be apparent to those skilled in the art that any of a wide range of different matching algorithms could be used to find a matching record in the database, depending on the type of user data. For example, matching algorithms suitable for processing biometric samples are discussed in the US patent applications with publication numbers US 2013/0093565 and US 2013/0016882, which are hereby incorporated by reference to the extent allowable by the law. The particular techniques used to compare the biometric samples and detect a match will be known to those skilled in the art, and are for example based on cascaded tests, in which multiple biometric modalities are for example applied one after another to each candidate biometric sample. For example, fingerprint and face recognition is discussed in the publications "Intelligent Biometric Techniques in Fingerprint and Face Recognition", Jain, L. C. et al. and "Partially Parallel Architecture for AdaBoost-Based Detection With Haar-like Features", Hiromote et al., the contents of which are hereby incorporated by reference to the extent allowable by the law.

If such a matching record is found, this means that the person who submitted the user input data has been identified. In response to this positive identification, the identification unit 102 for example transmits a response signal to the authorization requesting module that made the request. The response signal may simply indicate whether or not the person has been identified, or may also contain information such as the matching score achieved for the matching record and/or data associated with the registered user of the matching record, such as an ID number, name, address, payment account details, etc.

User location data is for example received by the identification unit 102 via an input 112. This location data for example indicates positions of location devices associated with registered users. The location data, along with associated time data, for a given registered user, is for example stored in the record of that user in the user database 108, and provides historical location information about this user, as will be discussed in more detail below.

Each of the authorization requesting modules 104A, 104B, 104C is for example respectively located within a corresponding geographical zone 114A, 114B, 114C. Each of the geographical zones 114A to 114C for example corresponds to the interior of the shop or restaurant in which the module is located, a neighbourhood within which the module is located, such as a shopping mall, airport or other building complex, or even the town or city in which the module is located. When making an identification request, the module 104A, 104B or 104C for example includes with the request an indication of the location of the module, and/or of the corresponding geographical zone. For example, the biometric identification unit 102 stores a list of identifiers of the authorization requesting modules 104A to 104C, and their corresponding geographical zones. The identification requests from the modules 104A to 104C for example include their corresponding identifier, such that the geographical zone can be identified.

The historical location information stored for each registered user in the user database 108 is for example used to narrow down the number of candidate records in the database before or while the matching algorithm is applied to the database. Additionally or alternatively, the historical location information is for example used as a further authentication measure by evaluating the likelihood of the user being at the particular location of the module 104A, 104B or 104C at the time of the identification request.

FIG. 2 illustrates an example of a portion of the user database 108 of FIG. 1 in the example that the database is a biometric database containing biometric records.

Three biometric records are shown in the example of FIG. 2 on three corresponding rows, and having user ID numbers "0001", "0002" and "0003" respectively indicated in a field 202. Of course in practise the database is likely to contain hundreds, thousands or even millions of records.

Each biometric record is associated with a corresponding registered user, but for security reasons, the database 108 for example only identifies these individuals by an ID number. A separate table, for example stored by the biometric identification unit 102, may indicate the mapping between the ID numbers of field 202 and biographic information of the corresponding registered user, such as name, address, account details etc.

A field 204 for example comprises a digital image of the face of the registered user, a field 206 for example comprises a digital image of the fingerprint of the registered user, a field 208 for example comprises a digital image of an iris scan of the registered user, and a field 210 for example comprises a digital image of the signature of the registered user. Fields 204, 206, 208 and 210 may additionally or alternatively store biometric templates, generated based on the corresponding images. Of course, in alternative examples of the biometric database 108, only some of these fields may be present and/or additional fields comprising other biometric data could be included.

In the example of FIG. 2, not all records comprise a sample in each field 204 to 210. For example, some of the registered users may not have provided all of the reference samples. In particular, only records 0001 and 0002 comprise images of the face of the registered users in field 204, labelled "image 1A" and "image 2A" respectively. Furthermore, only records 0002 and 0003 comprise fingerprint images of the registered users in field 206, labelled "image 2B" and "image 3B" respectively, and only records 0001 and 0003 comprise iris scan images of the registered users in field 308, labelled "image 1C" and "image 3C" respectively. All three records comprise signature images of the registered users in field 210, labelled "image 1D", "image 2D" and "image3D" respectively.

A field 212 for example comprises historical location information associated with each registered user. For example, record 0001 comprises a position P1 and associated time information t1, while record 0002 comprises a position P2 and associated time information t2 and record 0003 comprises a position P3 and associated time information t3. The positions P1 to P3 for example indicate the latest location information data available for the corresponding registered user. The time information t1 to t3 for example indicates the time that this location information was obtained. In other words, the time information indicates the age of the location information. Additionally, in some embodiments, further positions and corresponding time information may be stored for a given user. Such older location information is for example used to determine a likelihood of a user being at the location of the identification request at the time of the request. For example, if this location data indicates that the user regularly visits the geographical zone of the authorization requesting module 104A, 104B or 104C, this indicates a relatively high likelihood of the user making an identification request from this location, even if the latest position data is relatively far from that geographical zone.

FIG. 3 illustrates a user location system 300 for providing historical location information according to an example embodiment. The system 300 comprises a user location device 302 associated with a registered user of the biometric database 108 of FIG. 1. The user location device 302 is for example any mobile electronic device suitable for being carried by a registered user. A similar user location device is for example associated with each registered user of the user database 108. The device 302 is capable of wireless data communication, for example in a telecommunications network via a telecommunications mast 304, and/or with a wireless network router via a WiFi, Bluetooth or other suitable wireless communications interface 306, and/or with an NFC (near field communications) module 308.

The location device 302 for example comprises a positioning device, for example based on GPS (global positioning system), and periodically submits its location data, along with an identifier of the registered user, via one of the available wireless interfaces to the identification unit 102, for example via one or more intervening networks such as the internet. For example, the location device 302 is a smart phone or the like running a suitable application that, when activated and if the privacy settings are appropriately configured, periodically accesses the location data from a positioning device of the mobile phone, and transmits this along with the user ID to the biometric identification unit 102.

Alternatively or additionally, when the location device 302 enters within range of a wireless communications access point, such as the mast 304 or module 306 or 308, this automatically triggers the transmission of the location data and user ID to the biometric identification unit 102. Rather than being determined by a positioning device, other positioning means could be used. For example, the known location of access point 304, 306 and/or 308 could be used to locate the device 302 when it comes within communications range with one of these access points.

In some embodiments, one or more of the authentication requesting modules 104A to 104C in FIG. 1 has, located close by, a wireless communications access point, such that any location device passing within communications range of the access point will be identified, and the location data can be transmitted to the biometric identification unit 102. For example, in some embodiments, location data may be transmitted when the location device enters within the geographical zone 114A, 114B or 114C of FIG. 1. For example, it is assumed that a registered user, carrying their location device 302, enters a shop or restaurant in which the module 104A is located. Assuming that a wireless interface of the location device 302 is enabled, when the location device 302 enters within range of a WiFi network within this shop or restaurant, the current location data and user ID are for example automatically sent to the identification unit 102.

Figure 4:
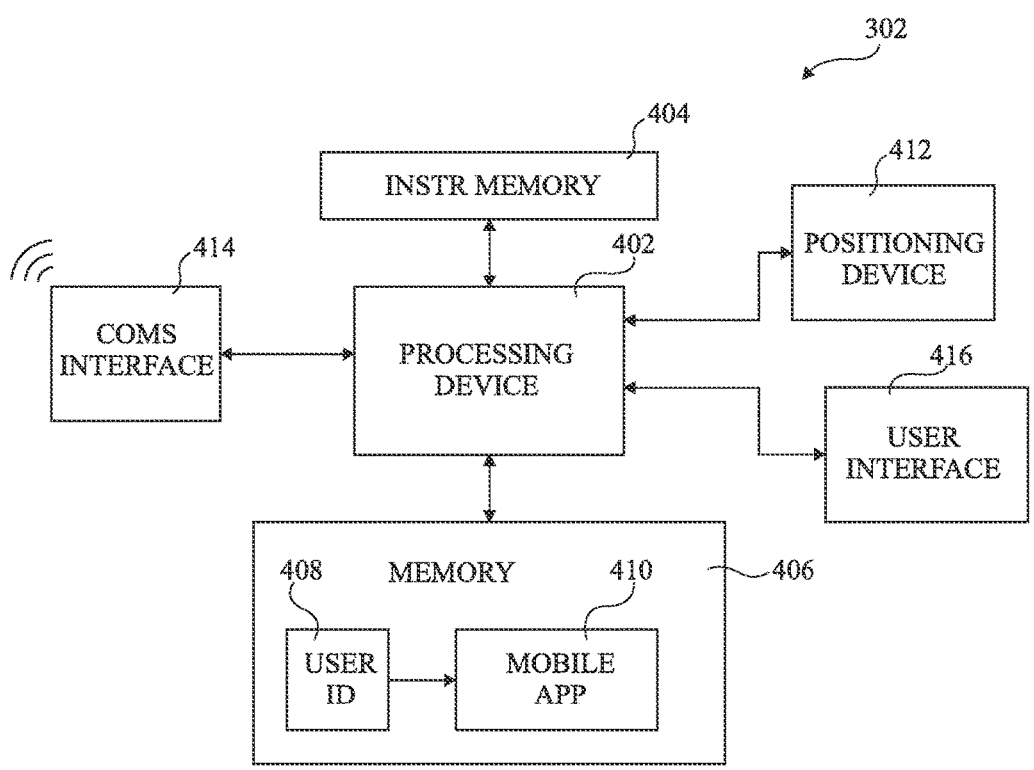
FIG. 4 schematically illustrates a user location device of FIG. 3 in more detail according to an example embodiment of the present disclosure.

FIG. 4 schematically illustrates the location device 302 of FIG. 3 in more detail according to one example. As illustrated, the location device 302 for example comprises a processing device 402 having one or more processors under the control of an instruction memory 404. For example, the processing device 402 may comprise one or more microprocessors, microcontrollers, digital signal processors, or appropriate combinations thereof, and executes instructions stored in the instruction memory 404, which could be a volatile memory such as a DRAM (dynamic random access memory), or another type of memory.

The processing device 402 is also for example coupled to a memory 406, which for example stores the user ID 408 associated with the registered user, and a mobile application 410 that controls when location data is transmitted to the identification unit 102. The location data is for example provided by a positioning device of the location device 302. A wireless communications interface 414, and a user interface 416 comprising for example a touch screen, are for example also coupled to the processing device 402.

Figure 5:
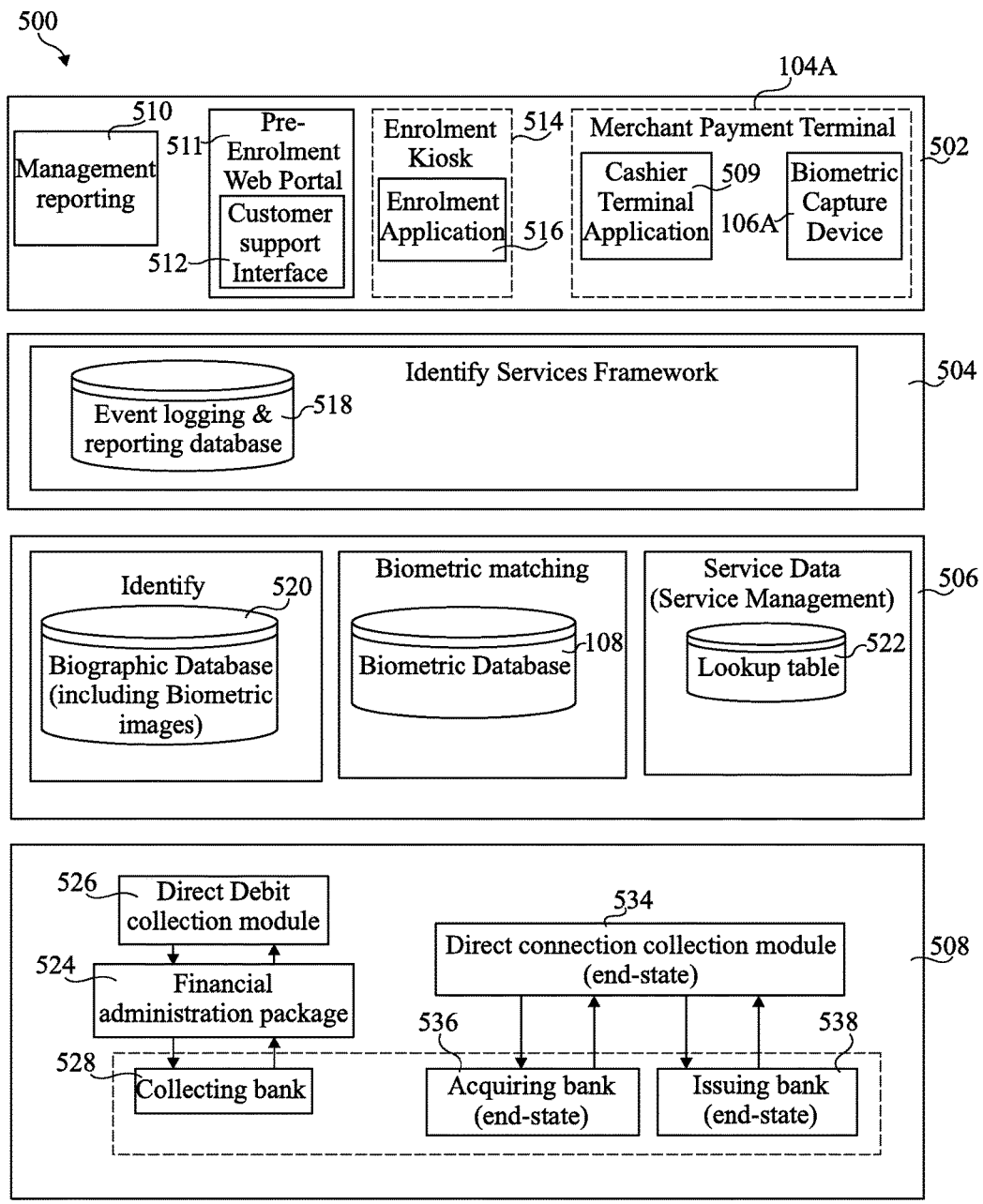
FIG. 5 schematically illustrates the user identification system of FIG. 1 in more detail according to an example embodiment of the present disclosure.

FIG. 5 schematically illustrates the identification system 100 of FIG. 1 in more detail according to an example in which it comprises a remote apparatus 502, an identity services framework module 504, memory banks 506, and a payment module 508.

The remote apparatus 502 for example includes the authorization requesting module 104A, and/or one or more other authorization requesting modules. The module 104A in this example is a merchant payment terminal comprising the biometric capture device 106A and a cashier terminal application 509. The remote apparatus 502 also comprises a management reporting module 510, which for example generates performance statistics, a pre-enrolment web portal 511 implementing a customer support interface 512, and an enrolment kiosk 514 implementing an enrolment application 516.

The identity services framework 504 for example comprises an event logging and reporting database 518, which for example stores event data used by the management reporting module 509.

The memory banks 506 include a matching module comprising the database 108, for example storing biometric samples in the form of templates or other types of user reference data. The memory banks 506 also include a biographic database 520, for example storing personal details of registered users and optionally storing the biometric images, based on which the biometric templates may be generated. The memory banks 506 also include a service data block 522 comprising a lookup table linking user records to payment information, as will be described in more detail below.

The payment module 508 includes a number of applications supporting various payment schemes, in this example direct debit and prepaid payment schemes. The direct debit payment scheme involves the use of a financial administration package 524 that controls the execution of payment requests. Package 524 for example communicates with a direct debit collection module 526, allowing payments to be debited directly from a user bank account, and also with the collecting bank 528, which is the bank associated with the source apparatus that is to receive the funds. The direct connection (pre-paid) payment scheme involves the use of a direct connection collection module 534, which communicates with the acquiring bank 536 receiving the funds and with the issuing bank 538 supplying the funds from the account of the user.

Figure 6:
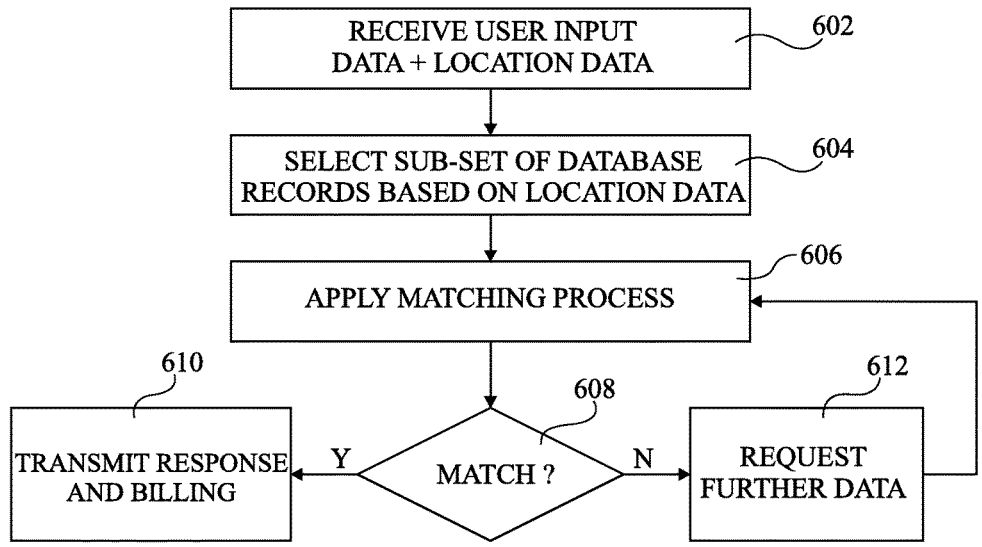
FIG. 6 is a flow diagram showing operations in a method of identifying a person according to an example embodiment of the present disclosure.

FIG. 6 is a flow diagram illustrating operations in a method of identifying a user record based on the identification system of FIG. 1 according to an example embodiment.

In an operation 602, user input data is received from one of the input devices 106A, 106B or 106C of a corresponding authorization requesting module 104A, 104B, 104C. The user input data is for example received along with location data indicating the location of the person to be identified. As mentioned above, the location data for example corresponds to an identifier of the module, which is at a location known to the identification system.

In subsequent operation 604, a subset of the records of the user database is for example selected based on the location data. Such a pre-filtering step is optional, as this filtering or verification can be performed on the individual records as the matching process is applied.

In a subsequent operation 606, a matching process is applied to identify the person, based on the user input data and on the location data. For example, the matching process is applied to the subset of records selected in operation 604 in the case that a pre-filter step has been performed. Alternatively, as each record is processed by the matching algorithm, it is also determined whether or not the record may be excluded based on the location data.

In either case, the location data submitted with the identification request is for example compared to one or more locations indicated by the historical location information of the registered user of each record in the database. In the case that the user input data is a unique identifier, for example a password, pin or account number, such a comparison for example provides an additional verification that the person requesting to be identified is indeed the registered user of the matching record. Additionally or alternatively, in the case that the user input data is a biometric sample, such a comparison permits a significant reduction in the number of candidate records to be processed by the biometric matching algorithm. For example, the number of records is reduced by a factor of at least 2, and in some embodiments by a factor of 10 or more.

For example, in some embodiments, the location data indicates the geographical zone 114A, 114B or 114C within which the authorization requesting module is located. A candidate record is only included in the subset or considered a match if the latest user position indicated by the historical location data is within the corresponding zone, and if the age of this position data is not older than a certain age threshold. The age threshold is for example a parameter of the system, and could be set at a value of between 1 and several hours. For example, the age of each record is determined by subtracting the time information associated with the position data from a current time.

As a further example, a distance separating the location of the identification request as indicated by the location data and one or more locations indicated by the historical location information of a candidate record is determined. This distance is compared to a threshold, and if the threshold is exceeded, the candidate record is for example filtered out or considered not to correspond to the person requesting identification.

The distance threshold may be variable based on the age of the historical location information. For example, historical location information indicating that a user was more than 500 km from the location of the identification request less than three hours before the request may lead to a record being deemed not to match, while historical location information indicating that a user was more than 1000 km from the location of the identification request less than six hours before the request may also lead to the record being deemed not to match.

The distance threshold may also be variable based on the transport infrastructure linking the locations. For example, if the identification request is made from the vicinity of an airport, and the historical location information is 6 hours old or less and indicates that a user was in the vicinity of another airport, a distance of up to 2000 km may be deemed feasible.

It will be apparent to those skilled in the art that the above examples are merely a few ways in which the historical location information can be used to identify a person. There are many other possibilities.

In a subsequent operation 608, it is determined whether or not a matching record has been found in the database, in other words whether or not the person has been identified. If so, the method for example ends at operation 610, in which a response is transmitted back to the authorization requesting module that submitted the identification request. In some embodiments in which the identification request corresponds to a payment authorization request in relation to a financial transaction, this operation also for example includes a billing operation of the identified person.

Alternatively, if no match was found, the next operation after 608 is 612 in which a request for further data is for example sent to the authorization requesting module that made the identification request. For example, the further data provides an alternative means of reducing the number of records to be considered by the matching algorithm. The further data for example corresponds to a date of birth, or telephone number, of the person to be identified.

Figure 7:
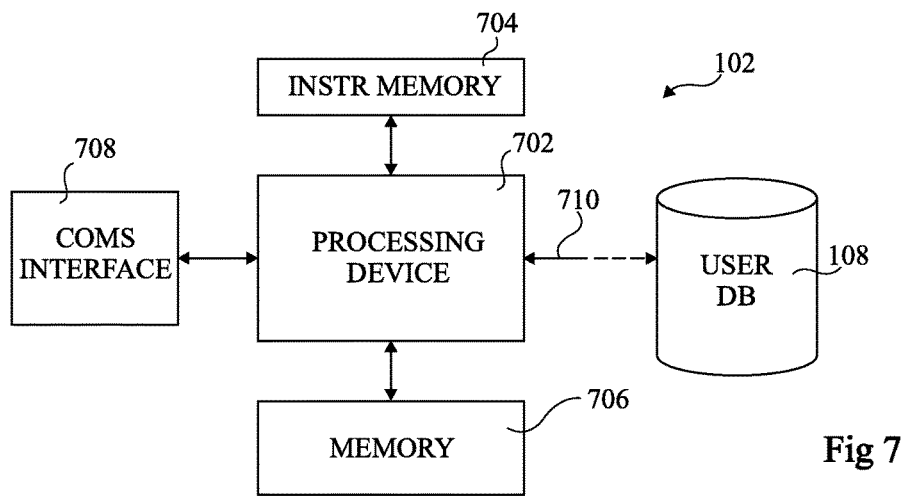
FIG. 7 schematically illustrates hardware implementing a biometric identification unit of FIG. 1 according to an example embodiment of the present disclosure.

FIG. 7 schematically illustrates the identification unit 102 of FIG. 1 according to an example embodiment, and is suitable for implementing the method of FIG. 6. As illustrated, the unit 102 for example comprises a processing device 702 having one or more processors under the control of an instruction memory 704. For example, the processing device 702 may comprise one or more microprocessors, microcontrollers, digital signal processors, or appropriate combinations thereof, and executes instructions stored in the instruction memory 704, which could be a volatile memory such as a DRAM (dynamic random access memory), or another type of memory.

The processing device 702 is also for example coupled to a memory 706, which for example stores the historical location information associated with the registered users in the user database 108. A wireless communications interface 708 is for example also coupled to the processing device 702, permitting communication with one or more authorization requesting modules and with one or more location devices associated with registered users.

Figure 8:
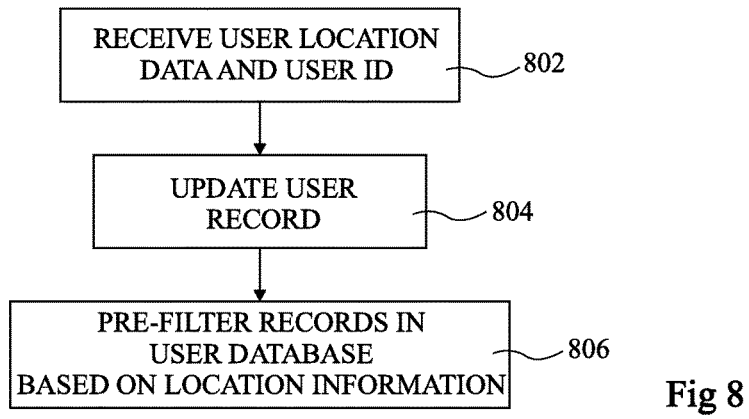
FIG. 8 is a flow diagram showing operations in a method for entering historical location information in a user database according to an example embodiment of the present disclosure.

FIG. 8 is a flow diagram showing examples of operations in a method for entering historical location information in a user database according to an example embodiment of the present disclosure.

In an operation 802, user location data, along with associated time information and a user ID of the registered user, is received by the identification unit 102. For example, the user ID is configured as a parameter in an application running on the user location device, which is for example a user's mobile phone.

In a subsequent operation 804, a record in the user database 108 of the registered user corresponding to the received location data is for example updated to include the historical location information based on a position indicated by the received location data, and the time associated with the location data.

In a subsequent operation 806, the records of the user database 108 are for example pre-filtered based on the updated historical location data and for one or more authorization requesting modules. Such a pre-filtering can for example be performed periodically, before any specific identification request is received, so that the identification requests can be processed even more quickly. For example, for each authorization requesting module, a pre-filtering operation is performed periodically, for example every few seconds, in order to maintain a subset of potential users who are likely to present themselves for identification at the module.

A feature of the example embodiments described herein is that the speed of identification can be greatly increased by reducing, in a simple fashion, the number of records to be considered, and/or the risk of fraud can be reduced.

While a number of specific embodiments of devices and methods of the present disclosure have been provided above, it will be apparent to those skilled in the art that various modifications and alternatives could be applied.

For example, it will be apparent to those skilled in the art that while the user database 108 is illustrated as being stored in a single memory, in some embodiment the various data of the database, such as the historical location data, could be distributed among different memories.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An identification method comprising:
   receiving, from an input device, user input data of a person to be identified and first location data indicating a location of the person to be identified; and
   identifying by a processing device, in a user database storing a plurality of user records of registered users, each record comprising user reference data and historical location information of a registered user, a record of said person to be identified based on said user input data and said first location data, wherein the historical location information of at least one of said registered users includes an association of time and second location data provided by a user location device associated with the registered user,
   wherein identifying a record of said person to be identified comprises:
      selecting a subset of said plurality of records, the selecting comprising:
         determining a geographic distance from a comparison between said first location data and said historical location information of candidate records of the plurality of records;
         comparing the geographic distance to a variable distance threshold for each candidate record, wherein the variable distance threshold is varied based on transport infrastructure linking locations of the first location data and the historical location information of each candidate record;
         comparing an age of the historical location information of each candidate record to an age threshold; and
         selecting at least one of the candidate records for the subset based on the comparing of the geographic distance to the variable distance threshold and the comparing of the age to the age threshold; and
      applying a matching process to said selected subset to identify the record.

2. The method of claim 1, wherein the identified record is identified further based on user reference data in the subset of records.

3. The method of claim 1, wherein said user input data and said user reference data each comprise:
   a biometric sample; or
   a user identification number; or
   a user password or pin number; or
   any combination of the above.

4. The method of claim 1, wherein said user input data is a biometric sample of the person to be identified, said user database is a biometric database, and said user reference data is a biometric reference sample.

5. The method of claim 1, wherein said first location data is a location associated with an authorization requesting module comprising said input device.

6. The method of claim 5, wherein said first location data indicates a geographical zone within which said authorization requesting module is located.

7. The method of claim 1, wherein said subset is additionally selected based on the age of said historical location information.

8. The method of claim 4, further comprising, prior to receiving said input biometric sample:
   receiving, from a user location device associated with said person to be identified, second location information indicating the location of said user location device and an identifier of said person, and storing said second location information in said biometric database to provide said historical location information.

9. A method of making a financial transaction comprising:
   receiving, from an input device, user input data of a person making a financial transaction request and first location data indicating a location of the person;
   identifying by a processing device, in a user database storing a plurality of user records of registered users, each record comprising user reference data and historical location information of a registered user, a record of said person based on said user input data and said first location data, wherein the historical location information of at least one of said registered users includes an association of time and second location data provided by a user location device associated with the registered user,
   wherein identifying a record of said person to be identified comprises:
      selecting a subset of said plurality of records, the selecting comprising:

determining a geographic distance from a comparison between said first location data and said historical location information of candidate records of the plurality of records;

comparing the geographic distance to a variable distance threshold for each candidate record, wherein the variable distance threshold is varied based on transport infrastructure linking locations of the first location data and the historical location information of each candidate record;

comparing an age of the historical location information of each candidate record to an age threshold; and selecting at least one of the candidate records for the subset based on the comparing of the geographic distance to the variable distance threshold and the comparing of the age to the age threshold; and applying a matching process to said selected subset to identify the record; and transmitting by said processing device an output signal authorizing said financial transaction based on the identified record.

10. An identification system comprising:

a user database storing a plurality of records of registered users, each record comprising user reference data and historical location information of a registered user, wherein said historical location information includes an association of time and second location data; and a processing device to:

receive, from an input device, user input data of a person to be identified and first location data indicating a location of the person to be identified; and identify a record of said person to be identified based on said user input data and on said first location data, wherein to identify a record of said person to be identified comprises:

select a subset of said plurality of records, the selecting comprising:

determining a geographic distance determined from a comparison between said first location data and said historical location information of candidate records of the plurality of records;

comparing the geographic distance to a variable distance threshold for each candidate record, wherein the variable distance threshold is varied based on transport infrastructure linking locations of the first location data and the historical location information of each candidate record;

comparing an age of the historical location information of each candidate record to an age threshold; and selecting at least one of the candidate records for the subset based on the comparing of the geographic distance to the variable distance threshold and the comparing of the age to the age threshold; and apply a matching process to said selected subset to identify the record.

11. The identification system of claim 10, wherein said input device is a biometric capturing device, said user input data is an input biometric sample, and said user reference data is a reference biometric sample.

12. The identification system of claim 10, wherein said processing device is further adapted to transmit an output signal to:

a merchant payment terminal; or an entry system to a restricted area; or a border control gate; or a combination of any of the above.

13. The identification system of claim 10, further comprising at least one user location device associated with one of said registered users and adapted to provide said historical location data.

* * * * *

UNITED STATES PATENT AND TRADEMARK OFFICE
CERTIFICATE OF CORRECTION

PATENT NO. : 9,619,634 B2
APPLICATION NO. : 14/473439
DATED : April 11, 2017
INVENTOR(S) : Cyrille Bataller It is certified that error appears in the above-identified patent and that said Letters Patent is hereby corrected as shown below:

On the Title Page

At Item (30), Foreign Application Priority Data "13306181" should be "13306181.2".

Signed and Sealed this
Twenty-first Day of November, 2017

Joseph Matal
*Performing the Functions and Duties of the
Under Secretary of Commerce for Intellectual Property and
Director of the United States Patent and Trademark Office*